UNITED STATES PATENT OFFICE.

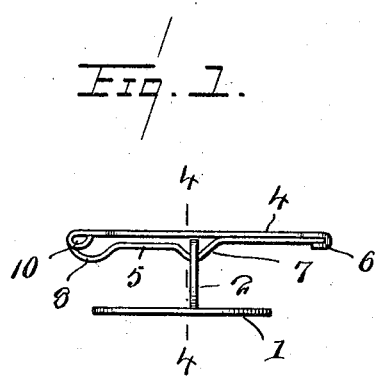
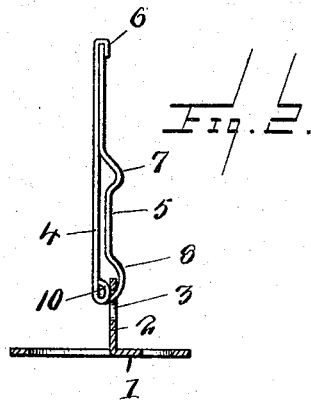
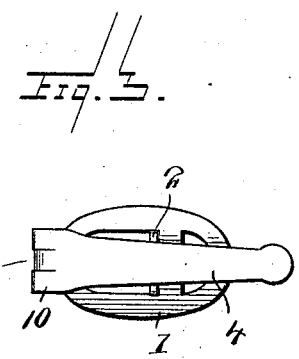
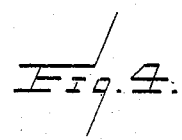
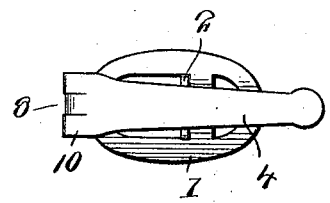
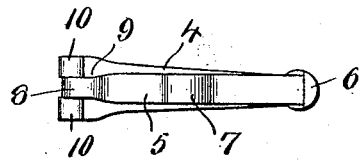
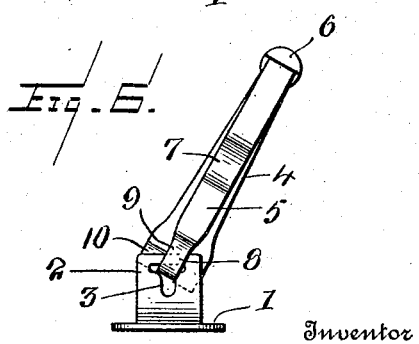

WILLARD A. HAYDEN, OF SEATTLE, WASHINGTON.

COLLAR-FASTENER.

1,185,599.  Specification of Letters Patent.  Patented May 30, 1916.

Application filed November 4, 1913. Serial No. 799,215.

*To all whom it may concern:*

Be it known that I, WILLARD A. HAYDEN, a citizen of the United States, residing at Seattle, in the county of King and State of Washington, have invented new and useful Improvements in Collar-Fasteners, of which the following is a specification.

This invention has relation to fasteners of the type designed most especially for securing the ends of a shirt collar to the neck band of the shirt, the novelty residing in the peculiar construction which admits of the easy and convenient manipulation of the fastener when securing or releasing the ends of the shirt collar.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is an edge view of a collar fastener embodying the invention. Fig. 2 is a view similar to Fig. 1, showing the fixed member in section and the movable member turned to aline with the shank of the fixed member. Fig. 3 is a front view of the fastener. Fig. 4 is a section on the line 4—4 of Fig. 1, looking to the right. Fig. 5 is a detail view of the movable member. Fig. 6 is a top plan view, showing the movable member swung to one side at its outer end so as to engage with the end of a collar to be fastened.

Corresponding and like parts are referred to in the following description, and indicated in all the views of the drawing, by the same reference characters.

The fastener comprises essentially two members designated respectively as the fixed member and the movable member, the fixed member being relatively stationary in service, since it is applied to the neck band of the shirt. The fixed member comprises a back plate 1 and a shank 2, the latter having a T-shaped opening 3. The parts 1 and 2 may be of any construction and design and as illustrated the shank 2 is partly cut from the plate 1 and is pressed outwardly therefrom to occupy a position at a right angle thereto.

The movable member consists of a slender body and has connection with the fixed member to move longitudinally and to swing. The movable member comprises an outer element 4 and an inner element 5. These two elements 4 and 5 are connected at their ends and are adapted to spring apart intermediate of their ends. In the preferable construction the movable element consists of a strip or blank which is doubled upon itself, the end portions being connected in any manner and as shown by having one end 6 folded over the opposite end. The member 5 has a crimp or bend 7 intermediate of its ends which is adapted to receive the end portion of the shank 2 exterior to the opening 3, as indicated most clearly in Fig. 1. The fold between the end portions of the strip is enlarged, as indicated at 8, to admit of swinging the movable member from one side to the other or from a position in line with the shank 2 to a position parallel with the plate 1. The end portion of the member 5 opposite the enlarged portion of the fold 8 is reduced in width, as indicated at 9, to admit of the opposite end of the member being swung to the right or to the left when engaging the same with one end or the other of the collar in the act of fastening the same.

In order to distinguish the two ends of the movable member it is observed that one of such ends has a pivotal connection with the shank 2 of the fixed member and is designated as the pivot end, whereas the opposite end is adapted to pass through the buttonhole at the ends of the collar and is referred to as the entering end. The pivot end of the movable member is broadened to correspond with the width of the shank 2. The entering end of the movable member is made rounding so as to pass easily through the buttonhole of the collar. Shoulders 10 are formed at the pivot end of the movable member to prevent the end of the collar slipping from the shank 2 without being engaged therewith and during the time that the movable member is manipulated to engage the opposite end of the collar so that it may be easily engaged with the shank of the fixed member. The shoulders 10 are formed by portions of the blank or strip rolled or bent upon themselves.

To use the fastener the fixed member is fitted to the neck band of the shirt by passing the shank 2 thereof through the opening in the front of said band. When it is required to fasten the shirt collar the movable member is caused to aline with the shank 2, after which the entering end of such movable member may be swung to one side, as indicated in Fig. 6, and passed through the buttonhole at one end of the collar, after which the entering end of the movable member is drawn upon to bring it in line with the shank of the fixed member and at the same time the end of the collar is slipped along the movable member and pressed upon the shank 2 of the fixed member. The movable member is now swung in an opposite direction so as to engage the opposite end of the shirt collar, after which the entering end of the movable member is moved to a position in line with the shank of the fixed member while at the same time pressing the end of the collar toward the fixed member to cause it to pass upon the shank thereof. The two ends of the shirt collar now being engaged with the fixed member the movable member is swung to a position to bring it in a plane parallel with the back plate 1, after which it is slipped in the opening 3 of the shank 2 until the outer end of the shank enters the bend or crimp 7, when the fastening is in proper position for securing the collar.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A device of the character described consisting of a back plate, an intermediate right angularly disposed shank formed thereupon, a movable member having a straight member and a returned fold, said fold being formed with a strip providing a bend intermediate its ends, said shank being formed with a T-shaped opening, said straight member being enlarged to the width of the shank at one end and said fold being reduced opposite whereby to be of a lesser width than the horizontal part of said T-shaped opening, said straight member being bent around the opposite end of said fold and being rounded at this point, a loop being formed at the inner end of said fold adapted to space said straight member laterally of said shank, said loop being adjacent one end of said straight member, and rolled shoulders formed integrally at opposite sides of the medial portion of said straight member and engageable with the opposite side of said shank engaged by said loop.

In testimony whereof I affix my signature in presence of two witnesses.

WILLARD A. HAYDEN.

Witnesses:
JAMES A. KOEHL,
E. EDMONSTON, Jr.

Copies of this patent may be obtained for five cents each, by addressing the "Commissioner of Patents, Washington, D. C."